United States Patent
Ueda et al.

(10) Patent No.: US 7,161,695 B2
(45) Date of Patent: Jan. 9, 2007

(54) IMAGE INFORMATION DISTRIBUTING SYSTEM

(75) Inventors: Maroka Ueda, Nganano-ken (JP); Satoru Yanagi, Nganano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1057 days.

(21) Appl. No.: 09/826,898

(22) Filed: Apr. 6, 2001

(65) Prior Publication Data

US 2001/0046066 A1 Nov. 29, 2001

(30) Foreign Application Priority Data

Apr. 6, 2000 (JP) .............................. 2000-104880
Apr. 2, 2001 (JP) .............................. 2001-103856

(51) Int. Cl.
*G06F 15/00* (2006.01)
*G06K 1/00* (2006.01)
(52) U.S. Cl. ...................... 358/1.15; 358/1.15; 358/1.9
(58) Field of Classification Search ................. 358/1.1, 358/1.11–1.18, 1.9
See application file for complete search history.

(56) References Cited

U.S. PATENT DOCUMENTS

| | | | |
|---|---|---|---|
| 5,278,950 A | | 1/1994 | Takei et al. ................ 345/613 |
| 5,309,351 A * | | 5/1994 | McCain et al. .............. 700/3 |
| 5,436,734 A * | | 7/1995 | Yamauchi et al. .......... 358/448 |
| 5,687,332 A * | | 11/1997 | Kurahashi et al. .......... 345/706 |
| 6,124,841 A * | | 9/2000 | Aoyama ..................... 345/636 |
| 6,327,049 B1 * | | 12/2001 | Ohtsuka ..................... 358/1.18 |
| 6,525,770 B1 * | | 2/2003 | Ueda et al. ................. 348/316 |

FOREIGN PATENT DOCUMENTS

| | | |
|---|---|---|
| EP | 0 715 460 | 6/1996 |
| EP | 0 860 986 | 8/1998 |
| EP | 0 889 636 | 1/1999 |
| EP | 0 947 954 | 10/1999 |
| JP | 11-194903 | 7/1999 |
| JP | 11-331847 | 11/1999 |

* cited by examiner

*Primary Examiner*—Gabriel I. Garcia
*Assistant Examiner*—Thierry L. Pham
(74) *Attorney, Agent, or Firm*—Oblon, Spivak, McClelland, Maier & Neustadt, P.C.

(57) ABSTRACT

In an image processing system, a server stores first image information in a compressed manner therein and sends second image information that represents the same element as that of the first image information with information content smaller than that of the first image information to client systems. Then, the server acquires the result of operation conducted on the second image information and edits the first image information in accordance with the operating result. After edition, the server transmits the compressed first image information to the client systems. The client systems print the first image information which has been edited to a printer.

15 Claims, 9 Drawing Sheets

IMAGE INFORMATION DISTRIBUTING SYSTEM

CROSS-REFERENCE TO RELATED APPLICATIONS

This application is based upon and claims the benefit of priority from the prior Japanese Patent Applications No. 2000-104880, filed Apr. 6, 2000, and No. 2001-103856, filed Apr. 2, 2001, the entire contents of which are incorporated herein by reference.

BACKGROUND OF THE INVENTION

1. Field of the Invention

The present invention relates to a method of distributing image information between information processing apparatuses (also called "image processing apparatuses") each having a function of operating the image information through network such as a satellite line. In particular, the present invention relates to a technique of accepting a client's request and editing the image information along the request to efficiently distribute the edited image information.

2. Description of the Related Art

Up to now, printed elements such as a poster are utilized for the purposes of advertisement or publicity. There are various printed elements including a postcard size and a large-sized poster. As usual, a client requests a professional trader to prepare such a printed element.

However, in the case where the client requests the professional trader to prepare the printed element, if the number of printed elements is small, the costs for preparing the printed elements become frequently high according to experience.

On the other hand, in recent years, the performance of a color printer is extremely improved, and the price of the color printer are increasingly lessened. For that reason, a case in which the client purchases the color printer and prints a picture produced by the client through the color printer can make the costs lower than a case in which the client requests a professional trader to prepare a printed element.

However, even in this case, it is difficult for the client who is not a professional trader to prepare the printed element. This is because there are various options in printing environments, elements used within the printed element, such as a photograph image or an illustration image (hereinafter referred to as "element"), character fonts, edition and color sorts, and a heavy load is applied to an operator who prepares a layout and a computer system to be used when the client conducts all of the layout preparations. In particular, the edition of image information requires an excessive processing steps such that the compressed image information that represents the element to be used is expanded once.

SUMMARY OF THE INVENTION

The present invention has been made under the above-described environments, and therefore an object of the present invention is to provide an improved technique by which environments where layout is simply prepared in a computer system of a client are provided, and an edited image where elements are disposed or superimposed on each other in accordance with the layout preparation can be distributed through network.

In more detail, the object of the present invention is to provide an image processing apparatus and an image processing method which can edit image information rapidly and efficiently, and an image information distributing method using a plurality of image processing apparatuses.

Another object of the present invention is to provide a recording medium which is proper in implementing the above image processing method by a general-purpose computer.

In order to achieve the above objects, according to the present invention, there is provided a specific arrangement in which environments under which a layout is easily prepared by a client's computer are constructed, and image information which has been subjected to edition by which the elements are arranged or superimposed on each other in accordance with a prepared layout and other operating results can be distributed through network. As occasion demands, additional information is prepared on the client side so that the additional information can be reflected on image information which has been edited.

In the present specification, the "element" is directed to a material for representing an image such as a photograph image, an illustration image or a parts screen. Also, the "additional information" is added to the natural image information and includes information representative of a character font, an underline and so on.

According to one aspect of the present invention, there is provided an image processing apparatus comprising: a communication unit for communicating with an information processing apparatus having a function of operating image information; a storage for storing first image information which represents at least one element in a compressed format therein; and a controller for sending second image information which represents the at least one element to the information processing apparatus, the amount of the second image information being smaller than that of the first image information, acquiring result information representing an operation which is executed for the sent second image information on the information processing apparatus, editing the first image information according to the acquired result information in an intermediate process where the first image information stored in the storage is expanded, and sending the edited first image information in the compressed format to the information processing apparatus.

It may be arranged that the controller executes at least one of a moving process, an enlargement process, a reduction process and a deletion process on the at least one elements to edit the first image information in the intermediate process.

It may be arranged that the controller edits the first image information in the intermediate process according to the acquired result information such that one of the at least one element is superimposed on another of that when the first image information represents a plurality of elements.

It may be arranged that a network is provided to connect among the image processing apparatus, the information processing apparatus and other information processing apparatuses, and the controller broadcasts the first image information which is edited and composed to a plurality of desired information processing apparatuses of the information processing apparatus and the other information processing apparatuses. In the image processing apparatus, the network may comprise a satellite communication network.

According to another aspect of the present invention, there is provided an image processing apparatus comprising: a communication unit for communicating with an information processing apparatus which processes first image information and second image information in association with each other, both of the first image information and the second image information representing at least one element and the amount of the second image information being smaller than that of the first image information; an image processor for receiving the second image information from the information processing apparatus via the communication unit, displaying the received second image information on a given display device, receiving an operation instruction for the displayed second image information, processing the displayed second image information according to the operation instruction and sending result information representing the processed and displayed second image information to the information processing apparatus; and an output controller for receiving the first image information via the communication unit, which is edited according to the result information on the information processing apparatus, and causing a given printing device to print the received first image information.

It may be arranged that when the operation instruction includes adding process for adding additional information to the displayed second image information, the image processor saves the additional information, and the output controller executes a superimpose process for the received first image information and the saved additional information and causes the given printing device to print an result of the superimpose process.

According to another aspect of the present invention, there is provided an image processing method applied to an image processing apparatus having a communication unit for communicating with an information processing apparatus and a storage for storing first image information which represents at least one element in a compressed format therein, the information processing apparatus having a function of operating image information, the method comprising the steps of: sending second image information which represents the at least one element to the information processing apparatus, the amount of the second image information being smaller than that of the first image information; acquiring result information representing an operation which is executed for the se it second image information on the information processing apparatus; editing the first image information according to the acquired result information in an intermediate process where the first image information stored in the storage is expanded; and sending the edited first image information in the compressed format to the information processing apparatus.

It may be arranged that the editing step includes a substep of executing at least one of a moving process, an enlargement process, a reduction process and a deletion process on the at least one elements to edit the first image information in the intermediate process.

It may be arranged that the editing step includes a substep of editing the first image information in the intermediate process according to the acquired result information such that one of the at least one element is superimposed on another of that when the first image information represents a plurality of elements.

According to another aspect of the present invention, there is provided an image processing method applied to an image processing apparatus having a communication unit for communicating with an information processing apparatus having a function of processing first image information and second image information in association with each other, both of the first image information and the second image information representing at least one element and the amount of the second image information being smaller than that of the first image information; the method comprising the steps of: receiving the second image information from the information processing apparatus via the communication unit; displaying the received second image information on a given display device; receiving an operation instruction for the displayed second image information; processing the displayed second image information according to the operation instruction; sending result information representing the processed and displayed second image information to the information processing apparatus; receiving the first image information via the communication unit, which is edited according to the result information on the information processing apparatus; and causing a given printing device to print the received first image information.

It may be arranged that the image processing method further comprises the steps of when the operation instruction includes adding process for adding additional information to the displayed second image information, saving the additional information; and executing a superimpose process for the received first image information and the saved additional information, and the causing step includes a substep of causing the given printing device to print an result of the superimpose process.

According to another aspect of the present invention, there is provided an image information distributing method applied to a network system including a first image processing apparatus and a second image processing apparatus, the first image processing apparatus and the second image processing apparatus being interconnected each other, the first image processing apparatus storing first image information in a compressed format and second image information, both of the first image information and the second image information representing at least one element, the amount of the second image information being smaller than that of the first image information, the method comprising the steps of: sending the second image information to the second image processing apparatus from the first image processing apparatus; displaying the second image information on a given display device of the second image processing apparatus; receiving an operation instruction for the displayed second image information in the second image processing apparatus; processing the displayed second image information according to the operation instruction in the second image processing apparatus; sending result information representing the processed and displayed second image information to the first image processing apparatus from the second image processing apparatus; editing the first image information, in the first image processing apparatus, according to the result information in an intermediate process where the first image information stored in the storage is expanded; sending the edited first image information in the compressed format to the second image processing apparatus from the first image processing apparatus; and causing a given printing device of the second image processing apparatus to print the first image information sent from the first image processing apparatus.

It may be arranged that the network system includes other image processing apparatuses, and the edited first image information sending step includes a substep of broadcasting the first image information which is edited and composed to a plurality of desired information processing apparatuses of the second image processing apparatus and the other image processing apparatuses.

According to another aspect of the present invention, there is provided a storage medium having computer readable program code means embodied in the medium, the storage medium being applicable to a computer having a communication unit for communicating with an apparatus and a storage for storing first image information which represents at least one element in a compressed format therein, the apparatus having a function of operating image information, the computer readable program code means comprising: computer readable program code means for sending second image information which represents the at least one element to the apparatus, the amount of the second image information being smaller than that of the first image information; computer readable program code means for acquiring result information representing an operation which is executed for the sent second image information on the apparatus; computer readable program code means for editing the first image information according to the acquired result information in an intermediate process where the first image information stored in the storage is expanded; and computer readable program code means for sending the edited first image information in the compressed format to the apparatus.

According to anther aspect of the present invention, there is provided a storage medium having computer readable program code means embodied in the medium, the storage medium being applicable to a computer having a communication unit for communicating with an apparatus having a function of processing first image information and second image information in association with each other, both of the first image information and the second image information representing at least one element, the amount of the second image information being smaller than that of the first image information, the computer readable program code means comprising: computer readable program code means for receiving the second image information from the apparatus via the communication unit; computer readable program code means for displaying the received second image information on a given display device; computer readable program code means for receiving an operation instruction for the displayed second image information; computer readable program code means for processing the displayed second image information according to the operation instruction; computer readable program code means for sending result information representing the processed and displayed second image information to the apparatus; computer readable program code means for receiving the first image information via the communication unit, which is edited according to the result information on the apparatus; and computer readable program code means for causing a given printing device to print the received first image information.

According to another aspect of the present invention, there is provided a computer program operational on a computer having a communication unit for communicating with an apparatus and a storage for storing first image information which represents at least one element in a compressed format therein, the apparatus having a function of operating image information, the computer program comprising the steps of: sending second image information which represents the at least one element to the apparatus, the amount of the second image information being smaller than that of the first image information; acquiring result information representing an operation which is executed for the sent second image information on the apparatus; editing the first image information according to the acquired result information in an intermediate process where the first image information stored in the storage is expanded; and sending the edited first image information in the compressed format to the apparatus.

It may be arranged that the computer program is stored in a computer readable storage medium.

According to another aspect of the present invention, there is provided a computer program operational on a computer having a communication unit for communicating with an apparatus having a function of processing first image information and second image information in association with each other, both of the first image information and the second image information representing at least one element, the amount of the second image information being smaller than that of the first image information, the computer program comprising the steps of: receiving the second image information from the apparatus via the communication unit; displaying the received second image information on a given display device; receiving an operation instruction for the displayed second image information; processing the displayed second image information according to the operation instruction; sending result information representing the processed and displayed second image information to the apparatus; receiving the first image information via the communication unit, which is edited according to the result information on the apparatus; and causing a given printing device to print the received first image information.

It may be arranged that the computer program is stored in a computer readable storage medium.

According to another aspect of the present invention, there is provided an image processing apparatus comprising: a communication unit for communicating with an information processing apparatus having a function of operating image information; a storage for storing first image information which represents at least one element; and a controller for sending second image information which represents the at least one element to the information processing apparatus, the amount of the second image information being smaller than that of the first image information, acquiring result information representing an operation which is executed for the sent second image information on the information processing apparatus, editing the first image information according to the acquired result information, and sending the edited first image information to the information processing apparatus.

It may be arranged that the result information represents identification of the at least one elements and each location thereof.

According to another aspect of the present invention, there is provided an image processing method applied to an image processing apparatus having a communication unit for communicating with an information processing apparatus and a storage for storing first image information which represents at least one element, the information processing apparatus having a function of operating image information, the method comprising the steps of: sending second image information which represents the at least one element to the information processing apparatus, the amount of the second image information being smaller than that of the first image information; acquiring result information representing an operation which is executed for the sent second image information on the information processing apparatus; editing the first image information according to the acquired result information; and sending the edited first image information to the information processing apparatus.

It may be arranged that the result information represents identification of the at least one elements and each location thereof.

According to another aspect of the present invention, there is provided an image information distributing method applied to a network system including a first image processing apparatus and a second image processing apparatus, the first image processing apparatus and the second image processing apparatus being interconnected each other, the first image processing apparatus storing first image information and second image information, both of the first image information and the second image information representing at least one element, the amount of the second image information being smaller than that of the first image information, the method comprising the steps of: sending the second image information to the second image processing apparatus from the first image processing apparatus; displaying the second image information on a given display device of the second image processing apparatus; receiving an operation instruction for the displayed second image information in the second image processing apparatus; processing the displayed second image information according to the operation instruction in the second image processing apparatus; sending result information representing the processed and displayed second image information to the first image processing apparatus from the second image processing apparatus; editing the first image information, in the first image processing apparatus, according to the result information; sending the edited first image information to the second image processing apparatus from the first image processing apparatus; and causing a given printing device of the second image processing apparatus to print the first image information sent from the first image processing apparatus.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Now, a description will be given in more detail of preferred embodiments of the present invention with referenced to the accompanying drawings.

A description will be given in detail of an embodiment in which the present invention is applied to an edited image distributing system that distributes image information edited in accordance with a client's request is distributed through network. The network can be applied with network using a wire line such as internet, but in this example, an example using network through satellite communication which can ensure the communication capacity more will be described.

(System Structure)

Figure 1:
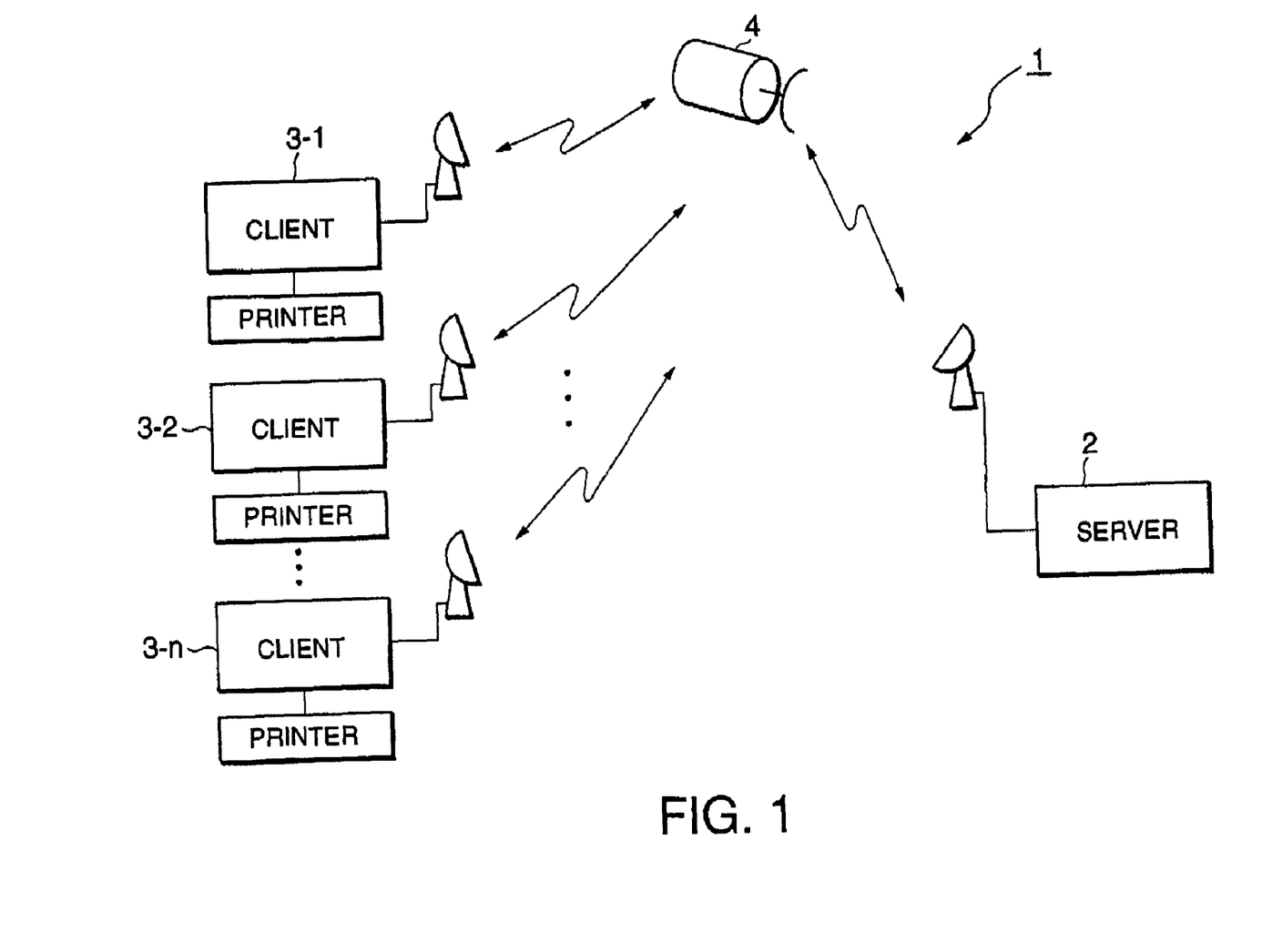
FIG. 1 is a diagram showing the structure of an edited image distributing system in accordance with an embodiment of the present invention.

FIG. 1 is a diagram showing the entire structure of an edited image distributing system 1.

The edited image distributing system 1 is made up of a server 2 which is an example of a first image processing apparatus, a plurality of client systems 3-1 to 3-$n$ ($n$ is a natural number; hereinafter referred to simply "3") which are an example of the second image processing apparatuses, and a satellite relay device 4 that transmits and receives data between the server 2 and the client systems 3.

The server 2 has the main functions of 1) supplying various elements due to the template and the display image information in accordance with a request from the client systems, 2) editing where the elements are disposed or superimposed on each other in accordance with a operation result in the client system 3, and 3) preparing printed data for a printer.

The client system 3 is a computer system disposed for each of clients that desires to prepare a printed element. The client system 3 has the main functions of 1) transmitting to server 2 of definition information representing element(s) assigned by an operator and its position on a printing area, 2) superimposing additional information such as a font type on an edited image, and 3) preparing printed data for a printer.

The satellite relay device 4 conducts relay communication using a satellite between the server 2 and the client systems 3. That is, the satellite communication is applied as the network of the edited image distributing system 1.

(Server Structure)

Figure 2:
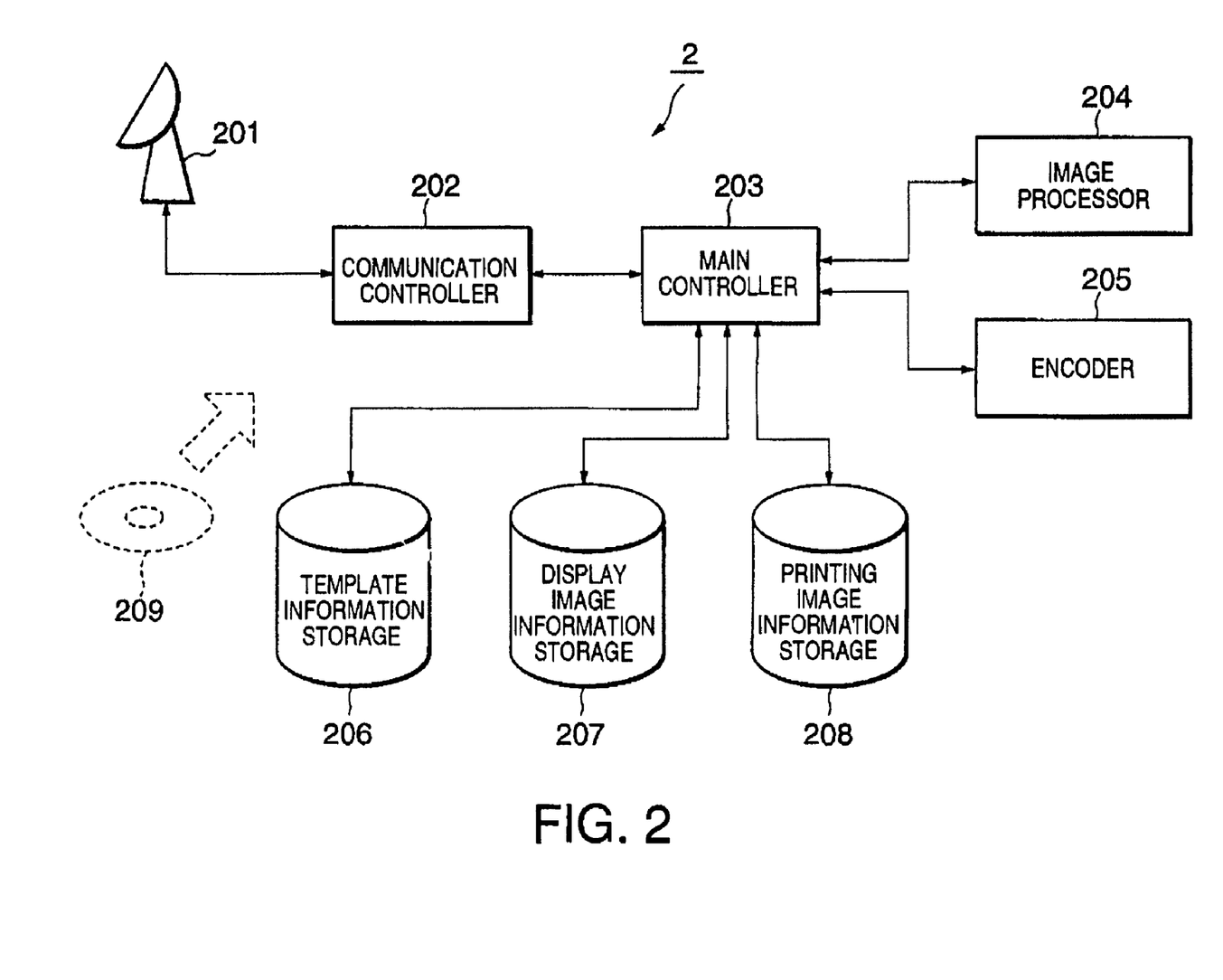
FIG. 2 is a block diagram showing the structure of a server in the edited image distributing system.

The structure of the server 2 will be described with reference to FIG. 2. The server 2 is made up of a satellite antenna 201, a processor 204, an encoder 205, a template information storage 206, a display image information storage 207 and a printing image information storage 208. The antenna 201 transmits and receives data with respect to the satellite relay device 4. The communication controller 202 controls the transmit/receive of the data conducted by the antenna 201. Specifically, the communication controller 202 transmits the data received from the antenna 201 to the main controller 203 and transmits data supplied from the main controller 203 to the satellite relay apparatus 4 through the antenna 201.

The main controller 203 controls the entire server 2. In particular, the main controller 203 controls the supply of the above-described element, the editing process and the supply of the edited image. The image processor 204 executes the editing process that disposes or superimposes the elements on each other in accordance with the operation result of the client system 3. In particular, the image processor 204 conducts the editing process by using a technique of superimposing the compressed image information on each other without completely expanding the image information. This technique can be applied with a technique disclosed in Japanese Patent Unexamined Publication No. Hei 11-331847. The encoder 205 codes the information transmitted to the client system 3.

The image processor 204 has a function of generating the edited image in order that when the plurality of element superimpose on each other, image information of the portion which turns to be shadow by another elements and that which is not printed out is eliminated.

The template information storage 206 stores the information on the template which becomes a model in the layout preparing process of the client system 3. The template includes information relating to a frame surrounding the print out image and information concerning the background of the image.

The display image information storage 207 holds the image information (hereinafter referred to as "display image information") on the element displayed on a display device of the client system 3 in the layout preparing process. The printing image information storage 208 holds the image information on the element (hereinafter referred to as "printing image information") used in the editing process of the server 2. The display image information storage 207 and the printing image information storage 208 hold the image information that represents the same element, respectively. A difference between the display image information and the printing image information resides in a difference in information content. That is, even if the same element is used, the display image information is smaller in information content than the printing image information, and in the case where the image information is displayed, a size occupied on a screen is also small. It is intended to take much of the load off the client system 3 in executing the edition process (layout process). Sum nail or the like can be applied to the display image information. The printing image information is normally held in the printing image information storage 208 in a compressed manner such as JPEG (joint photographic expert group) or GIF (graphics interchange format).

The main portion of the server 2 can be constructed by a so-called computer system. For that reason, the communication controller 202, the main controller 203, the image processor 204 and the encoder 205 are also realized by executing given program through a CPU (central processing unit). Specifically, program recorded in a recording medium such as a CD-ROM (compact disk-read-only-memory) 209 or program supplied through the network are stored in an arbitrary memory region, and the CPU conducts the processing in accordance with the program, thereby being capable of realizing various processing.

(Client Construction)

Figure 3:
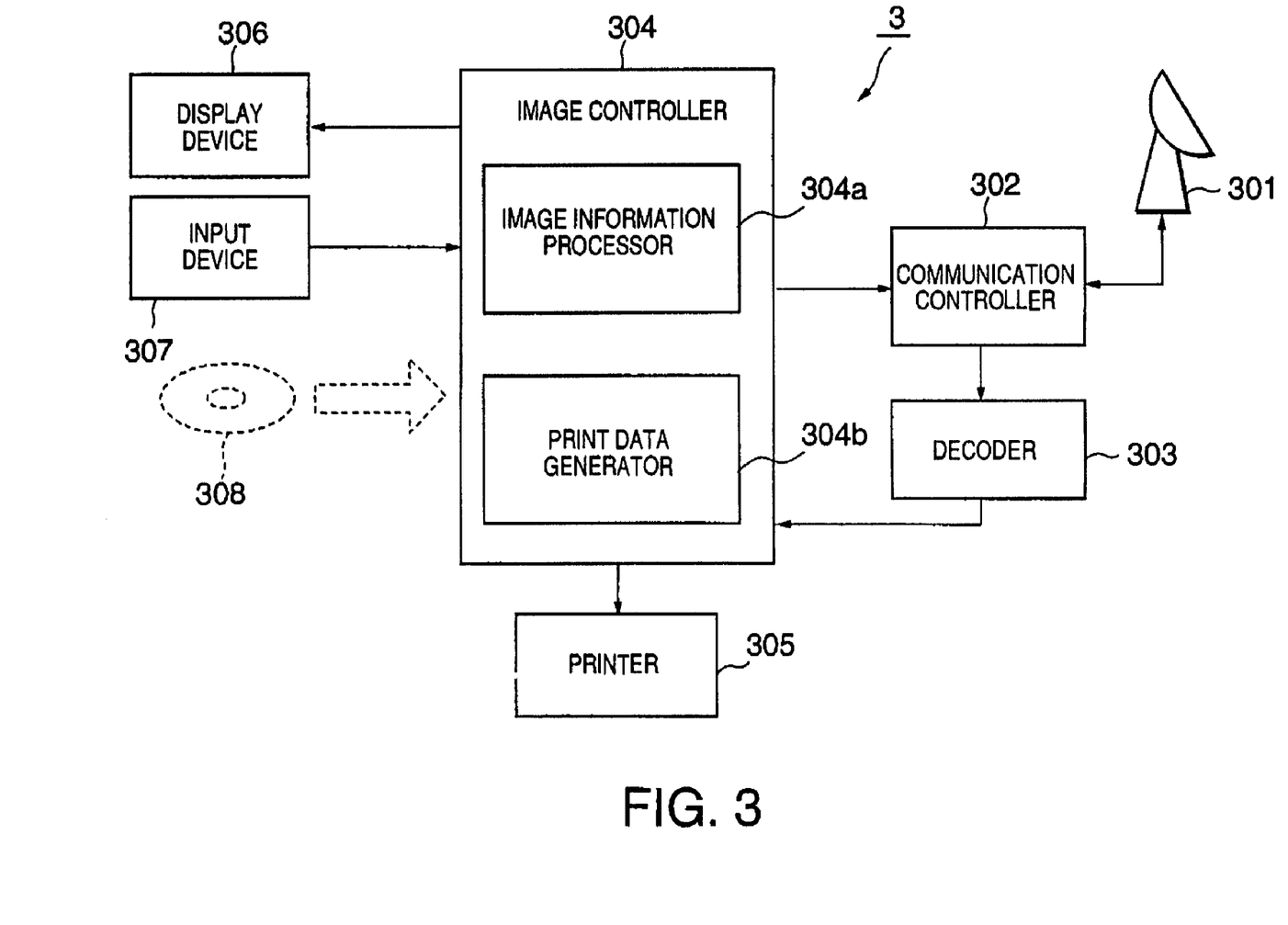
FIG. 3 is a block diagram showing the structure of a client system in the edited image distributing system.

The construction of the client system 3 will be described with reference to FIG. 3. The client system 3 is made up of an antenna 301, a communication controller 302, a decoder 303, an image controller 304, a printer 305, a display device 306 and an input device 307.

The antenna 301 conducts the transmit/receive of data with respect to the satellite relay device 4. The antenna 301 can be made common to a satellite broadcast antenna for home. The communication controller 302 controls the transmit/receive of the data conducted by the antenna 301. Specifically, the communication controller 302 transmits the data received by the antenna 301 to the decoder 303 and transmits the data supplied from the image controller 304 to the satellite relay device 4 through the antenna 301. The decoder 303 decodes the data received by the antenna 301 and transmits the decoded data to the image controller 304.

The image controller 304 controls the layout preparing processing in the client system 3. The image controller 304 includes an image information processor 304*a* and a print data generator 304*b*. The image information processor 304*a* requests the server 2 to supply the template and the element (display image information) and notifies the server 2 of the definition information for representing the element designated by an operator and its position. The print data generator 304*b* superimposes the additional information on the edited image supplied from the server 2 and prepares the printing data for a printer 305. The additional information includes character information, font information underline information and so on.

The printer 305 can print a sheet of the size provided in the client system 3 and desired by the client and can be formed of a color printer. The display device 306 displays the template or the display image information with respect to the operator of the client system 3. The display device 306 can be formed of a flat panel display such as an LCD (liquid crystal display). The input device 307 receives an instruction from the operator. The input device 307 is formed of the appropriate combination of a mouse, a keyboard and a pen input device.

The main portion of the client system 3 can be constructed by a so-called computer system. For that reason, the image information processor 304*a* and the print data generator 304*b* in the image controller 304 are also realized by executing given program through the CPU. Specifically, program stored in a storage medium such as a CD-ROM 308 or program supplied through the network are stored in an arbitrary memory region, and the CPU conducts the processing in accordance with the program, thereby being capable of realizing the processing due to the image controller 304.

(Image Processing Operation of Server)

Figure 4:
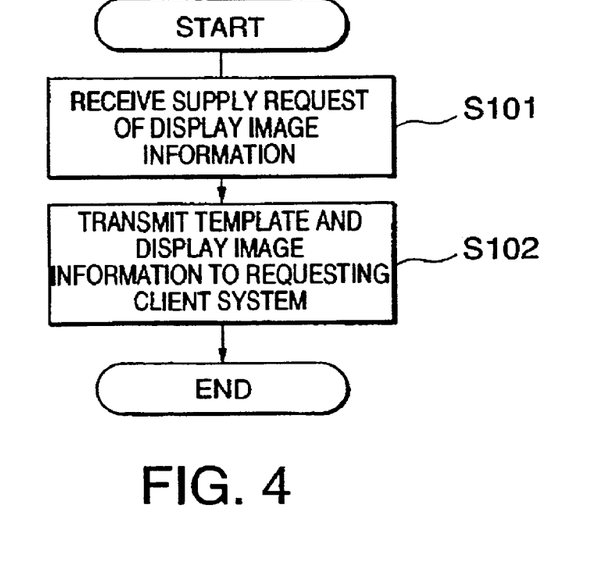
FIG. 4 is a flowchart for explanation of the main operation of the server.
Figure 5:
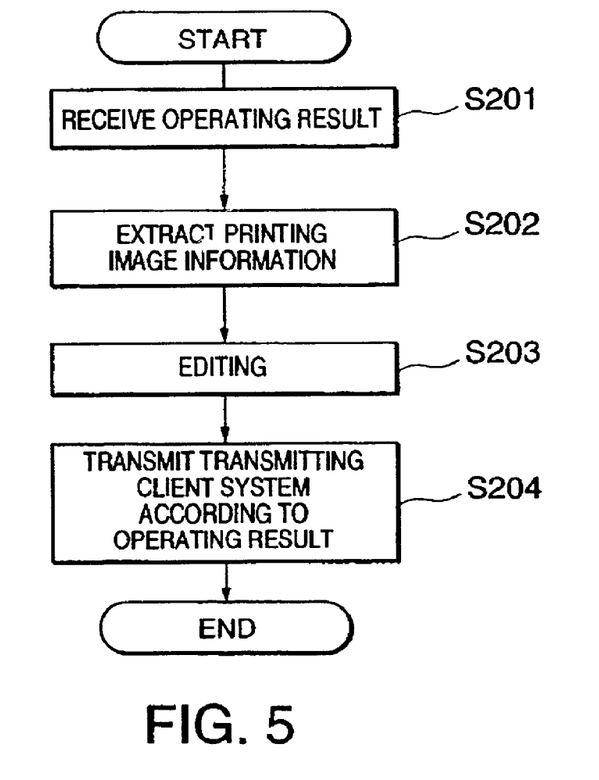
FIG. 5 is a flowchart for explanation of the main operation of the server.

Subsequently, the main operation of the server 2 will be described in brief with reference to FIGS. 4 and 5.

The main operation of the server 2 is roughly classified into the supply of various information for layout operation conducted at the client system 3 side and edition based on the result of the layout operation.

In the supply of various information, first, the main controller 203 receives a supply request of the display image information received by the antenna 201 and transmitted through the communication controller 202 (Step S101). Upon complying with the supply request, the main controller 203 extracts the display image information corresponding to at least one element from the display image information storage 207 and transmits the display image information to the communication controller 202. The communication controller 202 transmits the received information to a requesting client system 3 through the antenna 201 (Step S102).

In the edition based on the operating result, upon receiving the operating result of operating the transmitted display image information through the antenna 201, the communication controller 202 notifies the operating result (definition information) of the main controller 203 (Step S201). The main controller 203 extracts the printing image information that represents the same element as that of the display image information transmitted to the client system 3 from the printing image information storage 208 in accordance with the operating result and transmits the printing image information together with the operating result to the image processor 204 (Step S202).

The image processor 204 edits the received printing image information in accordance with the operating result in an intermediate process that expands the received printing image information (Step S203). In this edition, processes such as a moving process, an enlargement process, a reduction process or a deletion process are conducted on the printing image information. Also, a process of superimposing a plurality of element on each other may be demanded depending on the operating result. In this case, the image processor 204 edits the printing image information so as to reflect the superimposition of the elements in accordance with information defined on the superimposing axial direction.

The image processor 204 returns the printing image information which is an edition result to a compressed format as the edited image again and then transmits the compressed image information to the main controller 203.

The main controller 203 transmits the edited image to the encoder 205, and conducts the coding process on the edited image in the coding processing section. The main controller 203 receives the coded edited image and transmits the image to the communication controller 202. The communication controller 202 transmits the edited image to the client system 3 through the antenna 201 (Step S204).

(Image Processing Operation of Client System)

Figure 6:
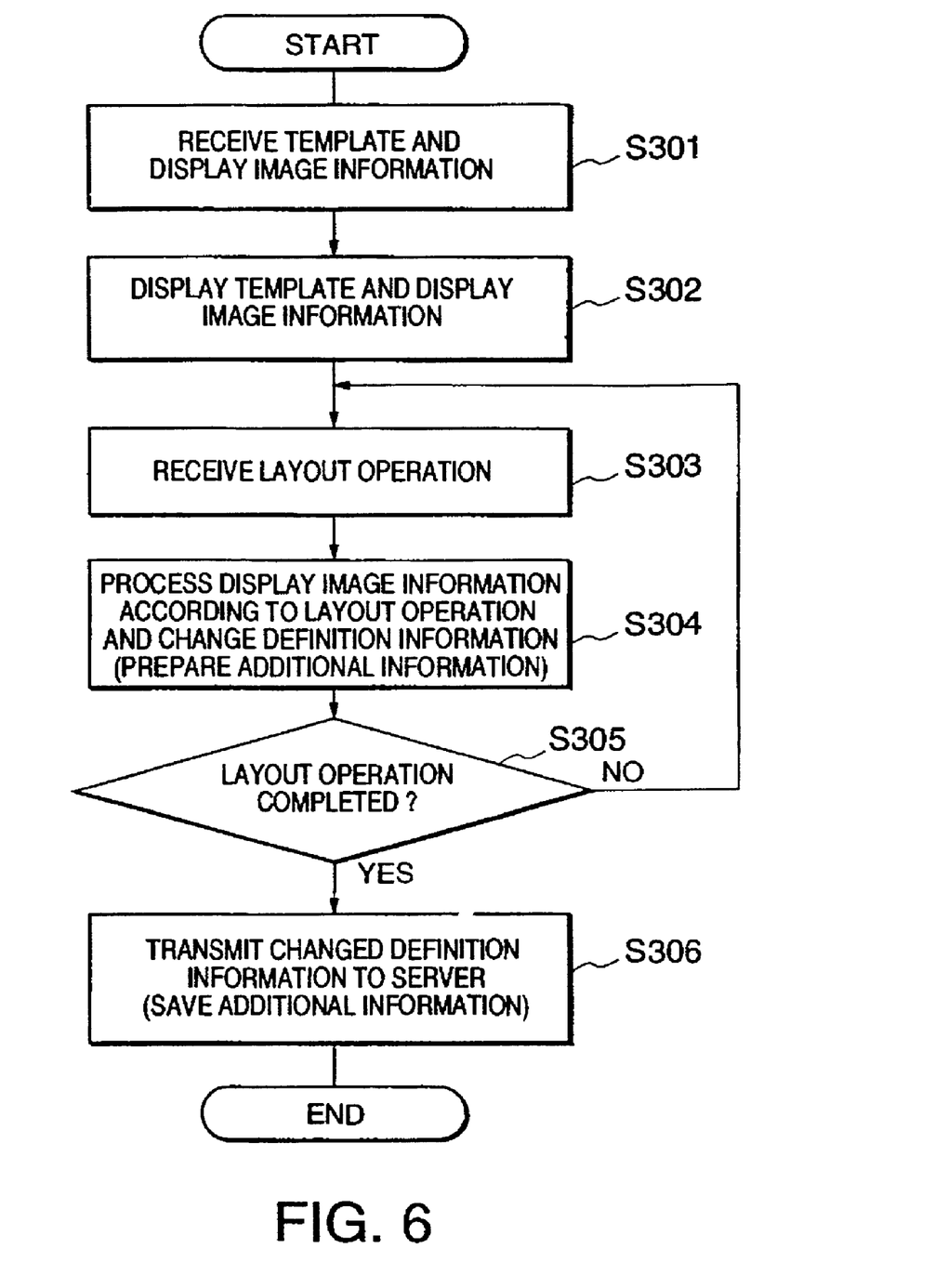
FIG. 6 is a flowchart for explanation of the main operation of the client system.
Figure 7:
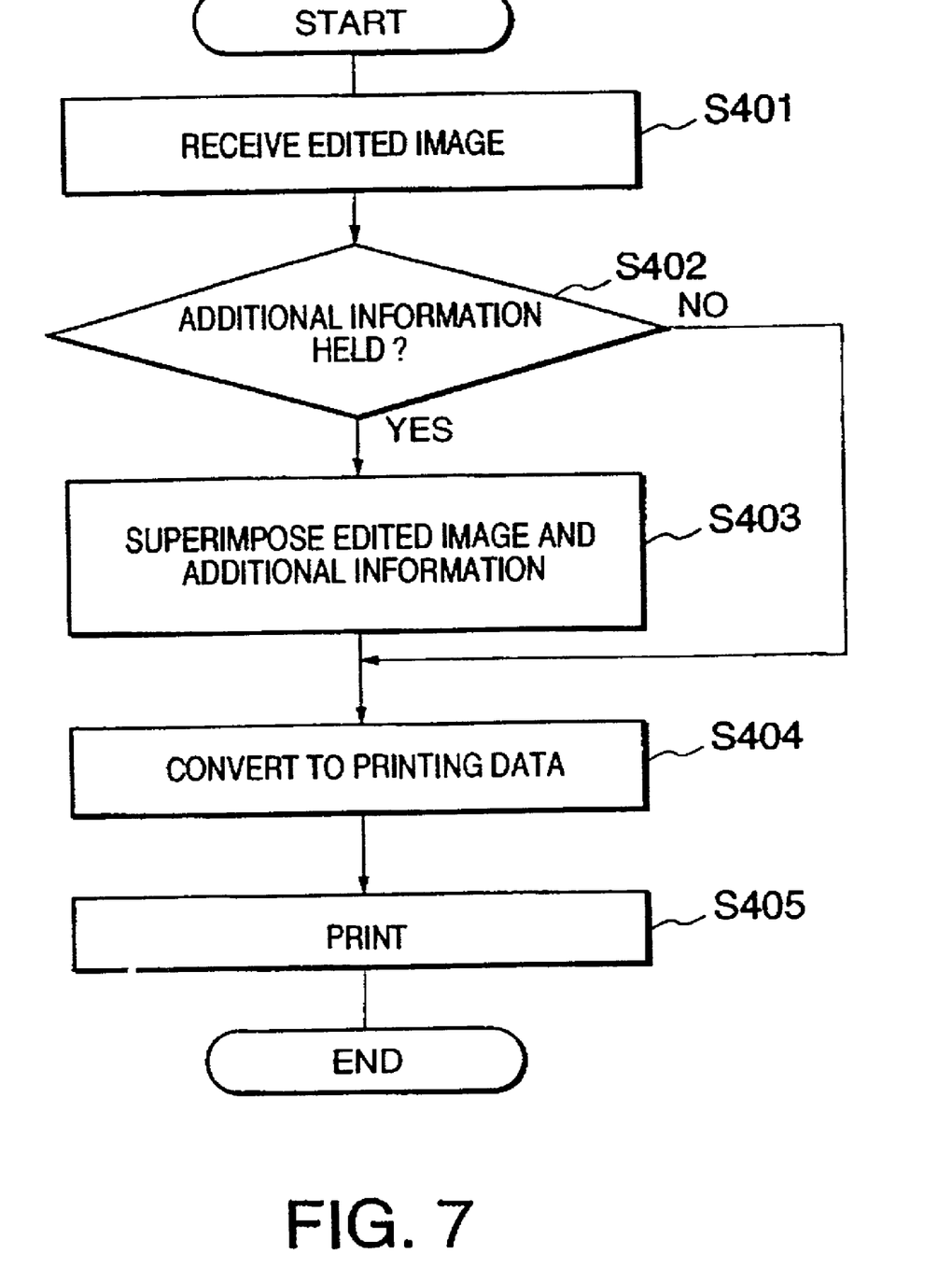
FIG. 7 is a flowchart for explanation of the main operation of the client system.

Subsequently, the main operation of the client system 3 will be described in brief with reference to FIGS. 6 and 7.

The main operation of the client system 3 is roughly classified into the receive of the layout operation which uses the display image information transmitted from the server 2 and the printing of the edited image transmitted from the server 2.

In the receive of the layout operation, the communication controller 302 first receives the template and the display image information which are coded through the antenna 301 and transmits the image information to the decoder 303 (Step S301). The decoder 303 decodes the template and the display image information. The decoded template and the decoded display image information are transmitted to the image controller 304.

The image information processor 304a of the image controller 304 displays the template and the display image information on the display device 306 (Step S302). The input device 307 receives the operation instruction of the operator with respect to the display image information and notifies the image information processor 304a of the display image information (Step S303).

The image information processor 304a processes the display image information displayed on the display device 306 in accordance with the notified operation instruction. Also, the image information processor 304a changes the definition information for defining the displayed element in accordance with the operation of the operator, that is, the processing of the display image information (Step S304). For that reason, the definition information exhibits the result of operation which has been conducted on the element by the operator. This processing is conducted until the layout operation by the operator is completed (Step S305: No). Upon receiving an instruction of the operation completion from the operator, the image controller 304 transmits the definition information to the communication controller 302. The communication controller 302 transmits the definition information to the server 2 through the antenna 301 (Step S305: Yes, Step S306).

Also, upon receiving an instruction to paste a character font onto the display image and to prepare the underline from the operator, the image information processor 304a produces the additional information in accordance with the instruction and sends the additional information to the print data generator 304b, to thereby hold the additional information within the client system 3.

In the print of the edited image, the communication controller 302 first receives the edited image produced by editing the printing image information in accordance with the definition information in the server 2 and transmits the edited image to the decoder 303 (Step S401). The decoder 303 decodes the edited image and transmits the decoded edited image to the print data generator 304b of the image controller 304.

In the case where the additional information is sent from the image information processor 304a, the print data generator 304b combines the edited image with the additional information (Step S402: Yes, Step S403). Note that, as for the combination of the edited image and added information, the combination process is executed such that the superimpose behavior of the element and also the each added information are reflected. The print data generator 304b converts the combined image or the edited image in the case where the additional information is not sent (Step S402: No), into printing data corresponding to the printer 305 and makes the printer 305 print the edited image (Steps S404, S405).

(Distribution of Edited Image)

Figure 8:
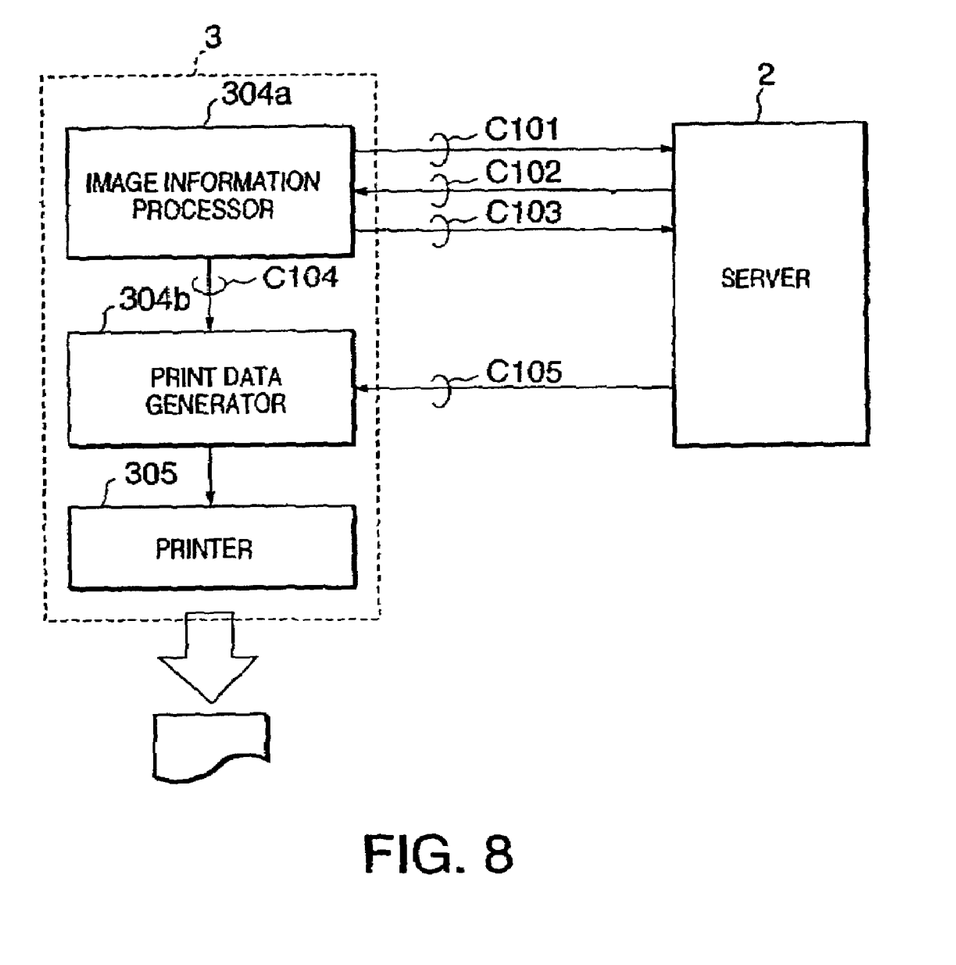
FIG. 8 is a diagram for explanation of the operation of the edited image distributing system.

Subsequently, a description will be given of an image distributing process which is realized by connecting the server 2 that conducts the above-described image processing and the client system 3 through network with reference to FIG. 8. FIG. 8 is a diagram for explaining mutual communication between the server 2 and an arbitrary client system 3 operated by the operator.

First, a request for conducting the layout preparing process of a printed element is received from the operator of the client system 3 by the input device 307. The image information processor 304a of the image controller 304 requests the server 2 to supply the template and the display image information corresponding to the desired at least one element in accordance with that request (C101). In this situation, the image information processor 304a may transmit the size of the printed element, the business category information of the client per se, and so on to the server 2 at the same time.

The main controller 203 of the server 2 extracts the template from the template information storage 206 and the display image information on several elements from the display image information storage 207. After the template and the display image information which have been extracted are coded by the encoder 205, they are sent to the client system 3 which is a supply requester (C102). When printed material size and/or business category of client him/herself are being sent, it may be arranged to choose the desired element in accordance with these information.

The image information processor 304a that has received the template and the display image information displays the image information where the element (display image information) is arranged in accordance with the template on the display device 306.

Figure 9A:
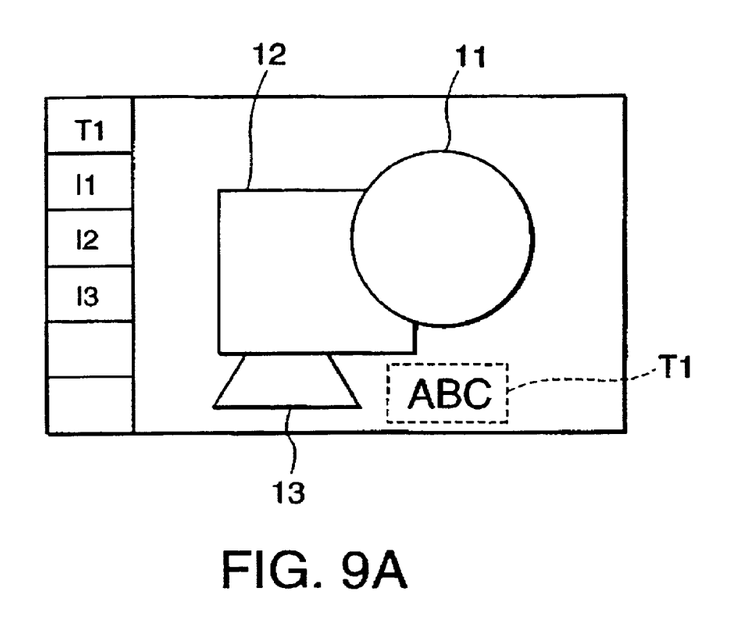
FIG. 9A is a diagram showing an example of a picture disposed on a display device of the client system.

An example of the image information displayed on the display device 306 is shown in FIG. 9A. The image information includes three image information I1 to I3 and one text data, and those information and data are arranged in accordance with the template. On the left side of the screen, identification numbers for identifying the displayed elements are displayed so as to indicate the order from near side of the screen. The positions on this two dimensional plane of the elements and text data displayed on the display screen of display device 306 can be identified using X, Y coordinates. The order of the elements and texts in the direction perpendicular to the display screen is established by assuming that the near side of the display screen is the upper side. This order is displayed in the left end portion of the screen. Here, the order from near side of the display screen is referred as "Z-Order" in this specification.

The operator can arrange the element at a desired position, add or delete the element by operating the input device 307.

The operation includes:

printing environment operation (a kind of printer, the kind of sheet, a sheet size, a printing method)

the selection of a template (frame, background image selection)

the selection of the element (photograph image, illustration image)

the selection of character (a font, a size, a color)

edition of character (insertion, movement, deletion)

the edition of contents (movement, enlargement, reduction, deletion).

The contents include the character font and the element.

Figure 9B:
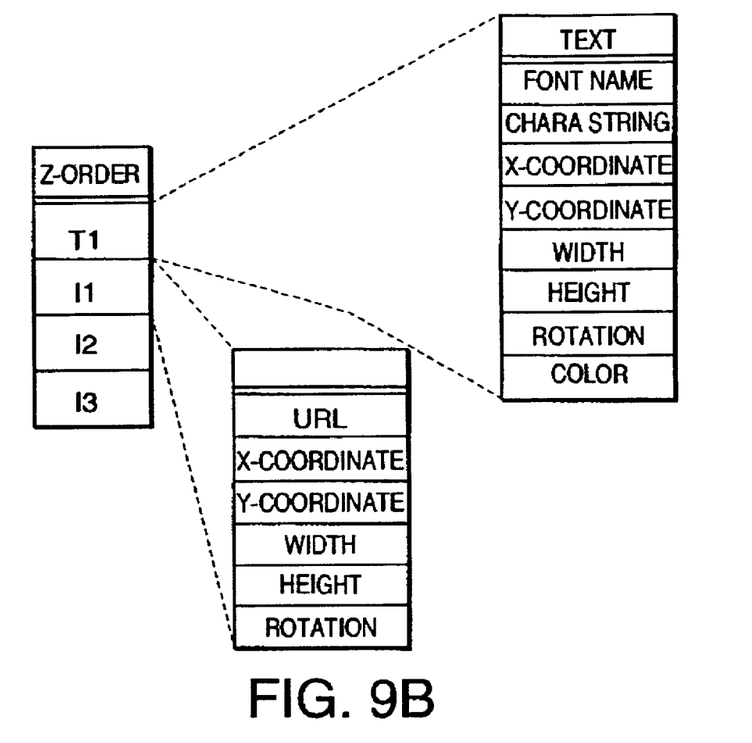
FIG. 9B is a diagram showing the structural example of the definition information of a displayed element.

The image information 304*a* holds the definition information on the displayed image information and updates the definition information in accordance with the operation of the operator. An example of the definition information is shown in FIG. 9B. The definition information includes the information representing the Z-Order of the elements, and the detail data of the respective elements and the additional information (in this example, character font). In case of the character font, the detail data includes information related to a font name, a displayed character string, the X-coordinate and Y-coordinate indicative of the start position of the print (display), the display width, the height, the rotation and a color. In case of the element, the detail data includes information related to an URL (uniform resource locator) indicative of a position at which the printing image information is held, the X-coordinate and Y-coordinate indicative of the start position of the print (display), a display width, a height, and the rotation. FIG. 9B shows the respective items of only the text T1 and the image information I1 for simplifying the drawing.

The image information processor 304*a* transmits the information of the Z-Order and the detail data of the element which is image information, both are included the definition information, to the server 2 as the operation result in accordance with the decision of the element to be used and the arrangement of the element by the operator (C103). The image information processor 304*a* does not transmit the detail data of the additional information to the server 2 but transmits the detail data together with the Z-Order to the print data generator 304*b* (C104). The Image controller 304*a* sends the information representing Z-order to both server 2 and print data generator 304*b*. This is because the information representing Z-order is used for editing process in server 2 and for combination process in print data generator 304*b*.

The server 2 conducts the edition processing using the printing image information corresponding to the element in accordance with the definition information transmitted from the client system 3. In this situation, the image processor 204 conducts the edition processing without completely expanding the compressed and held printing image information. In this editing process, when plurality of elements superimpose each other, the portion of the image information which turns to be shadow by another elements and that which is not printed out in actuality is dealt for not being included by edited image.

Figure 10:
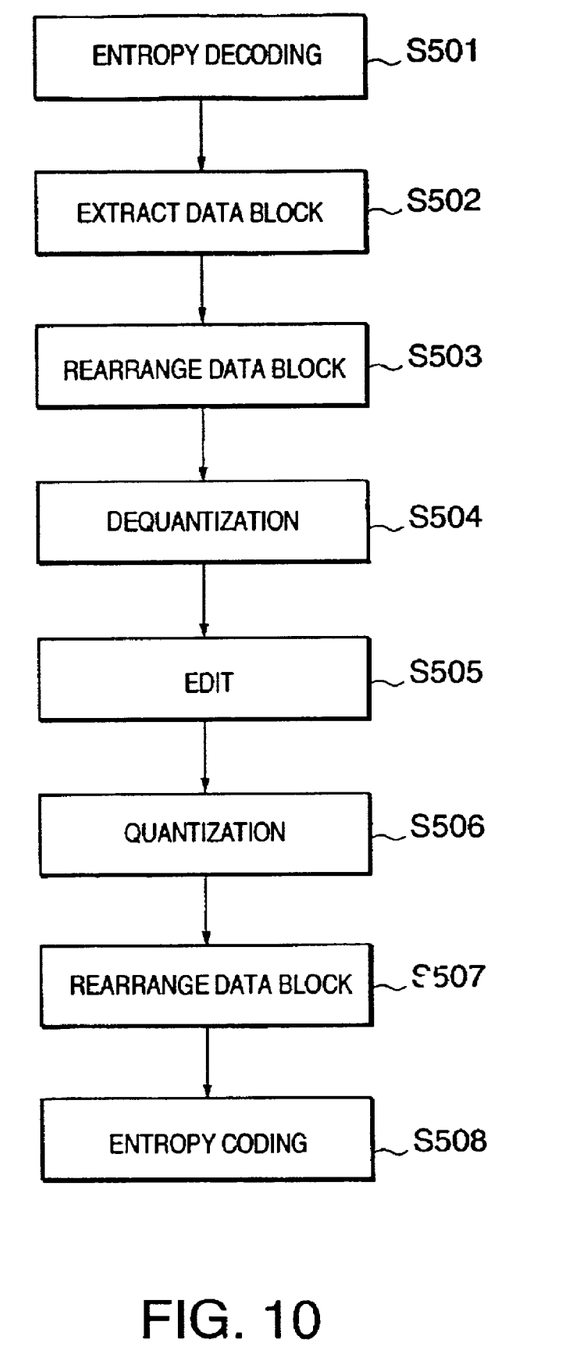
FIG. 10 is a flowchart showing a procedure of conducting an editing process without completely expanding the compressed image information in the server.

FIG. 10 is a diagram for explaining a procedure of conducting the edition processing by the image processor 204. First, entropy coding is conducted on the printing image information which is a compressed image regulated by a data block based on plural number of times of linear transformations, and a data block based on the plural number of times of linear transformations is extracted (Steps S501 and S502). Thereafter, the extracted data block is re-arranged and dequantized (Steps S503 and S504). As a result, even if the compressed image is not completely expanded, the expanding processing is conducted till an intermediate stage. Thereafter, the edition processing is conducted (Step S505). The edited image produced as a result of the edition processing is quantized, and after the data block is re-arranged, entropy coding is conducted (Steps S506, S507, S508). As a result, the edited image becomes data again compressed.

The edited image is transmitted to the client system 3 after the edited image has been coded by the encoder 205 (C105).

Upon receiving the edited image from the server 2, the print data generator 304*b* combines the additional information transmitted from the image information processor 304*a* with the edited image in accordance with the detail data and the Z-order information. In addition, the print data generator 304*b* converts the combined image information into the printing data for the printer 305 and supplies the printing data to the printer 305. The printer 305 conducts the printing processing in accordance with the printing data.

When the additional information is not sent from the image information processor 304*a*, the print data generator 304*b* converts the edited image received from server 2 into the printing data for the use of printer 305 and then provides this with the printer 305.

With the above processing, the edited image is distributed to the client, and a printed element desired by the client is outputted from the printer 305.

As was described above, according to this embodiment, the edited image that complies with the client's request can be appropriately supplied through the network. In particular, in this embodiment, because an instruction (operation) is received from the client by using the image information with information content smaller than that of the image information used for printing, a load applied to the client system 3 is reduced. Also, a load applied to the transmit/receive is reduced so as to enable the quick transmit/receive processing. As to information received and sent between the server 2 and the client system 3 by the time the editing process is carried out, the information sent from the server 2 to the client system 3 is display image information with small amount of information (C102 in FIG. 8) and the information sent from the client system 3 to the server 2 is the definition information after lay out operation (C103 in FIG. 8). For this reason, the information to be received and sent is small and also the load for receiving and sending is decreased, and then it can be possible to implement the prompt receive and send process. Also, because a technique of superimposing the compressed image information on each other without completely expanding the image information is used in conducting the editing processing in the server 2, the processing load of the server 2 is remarkably lessened. As a result, the rapid distribution of the edited image through the network can be realized.

In this embodiment, a satellite line is used for the network. In the case of distributing the edited image by using the satellite line, the transmitting performance is improved, and a so-called broad casting that supplies the same edited image to a plurality of client systems 3 at the same time is enabled. Accordingly, in the case where the client has many branch offices, the edited image requested from a head office can be distributed to the respective branch offices at the same time.

As is apparent from the above description, according to this embodiment, environments under which the layout can be easily prepared are constructed in the client system, and the edited image where the elements are arranged or superimposed on each other is distributed through network in accordance with the prepared layout and other operating results. In more detail, the layout preparation of the client side is facilitated using the image information with the smaller information content, and the image information to be naturally used is edited in accordance with the operation of the image information, thereby being capable of easily constructing a system that distributes the edited image rapidly and efficiently.

Also, since a technique of superimposing the compressed image information on each other without completely expanding the compressed image information is used in conducting the editing processing, the load of a device that conducts the edition is lessened, and the edited image is rapidly distributed.

In the editing process, when plurality of elements superimpose each other, the portion of the image information which turns to be shadow by another elements and that which is not printed out (area) in actually is dealt for not being included by edited image. For this reason, it becomes possible to avoid receiving and sending the unnecessary data and improve the sending speed of editing image. As a result, it is expected to implement to distribute the edited image with high efficiency.

The functions that are realized by software among the functions of the client system 3 are formed by reading program within the CD-ROM 308 by a general-purpose computer system and executing the program as described above. In addition, the communication controller 302, the decoder 303 and the image controller 304 in the server 2 may be also formed by reading program recorded in a recording medium such as a CD-ROM by the general-purpose computer system and executing the program.

Also, not only the server 2 and the client system 3 have the respective functions formed by only the program recorded in the recording medium, but also parts of the server 2 and the client system 3 are formed by using an operating system installed in the computer system or the functions of another application program within the scope of the present invention.

As was described above, according to the present invention, there is a unique advantage that the environments under which the image information is edited rapidly and efficiently can be easily constructed.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image processing system comprising:
a communication unit configured to communicate with an information processing apparatus, the information processing apparatus configured to operate on image information;
a storage configured to store first image information which represents at least one element; and
a controller configured to send second image information to the information processing apparatus, said second image information represents the at least one element and an amount of the second image information is smaller than an amount of the first image information, wherein
the controller is further configured to acquire result information, the result information being a result of an operation which is executed on the sent second image information in the information processing apparatus, the result information includes information with a z-order of the at least one element in the second image information, wherein the z-order indicates whether the at least one element is arranged nearer or farther to a viewer of the second image information;
the controller is further configured to edit the first image information, the first image information is edited according to the acquired result information, so that if at least two elements superimpose each other, a portion of the image information covered by any of the at least two elements is not included by the edited first image information; and
the controller is further configured to send the edited first image information to the information processing apparatus for printing by a printing device provided at the information processing apparatus.

2. The image processing system according to claim 1, wherein the controller is further configured to execute at least one of a moving process, an enlargement process, a reduction process, and a deletion process on the at least one element during said editing of the first image information.

3. The image processing system according to claim 1, wherein a network is configured to connect among the image processing apparatus, the information processing apparatus and other information processing apparatuses, and
the controller is further configured to broadcast the first image information which is edited and composed to a plurality of desired information processing apparatuses of the information processing apparatus and the other information processing apparatuses.

4. The image processing system according to claim 3, wherein the network comprises a satellite communication network.

5. An image processing system comprising:
a communication unit configured to communicate with an information processing apparatus configured to process first image information and second image information in association with each other, both of the first image information and the second image information representing at least one element and an amount of the second image information being smaller than an amount of the first image information;
an image processor configured to receive the second image information from the information processing apparatus via the communication unit, configured to display the received second image information on a given display device, configured to receive an operation instruction for the displayed second image information, configured to process the displayed second image information according to the operation instruction, and configured to send result information representing the processed and displayed second image information to the information processing apparatus, the result information includes information with a z-order of the at least one element in the second image information, wherein the z-order indicates whether the at least one element is arranged nearer or farther to a viewer of the second image information; and an output controller configured to receive the first image information via the communication unit, the first image information being edited according to the result information on the information processing apparatus, and configured to cause a given printing device to print the received first image information, and wherein when the operation instruction includes adding process for adding additional information to the displayed second image information, the image processor saves the additional information, and the output controller executes a superimpose process for the received first image information and the saved additional information and causes the given printing device to print a result of the superimpose process.

6. An image processing method applied to an image processing apparatus including a communication unit configured to communicate with an information processing apparatus and a storage configured to store first image information which represents at least one element, the information processing apparatus configured to operate on image information, the method comprising:

sending second image information which represents the at least one element to the information processing apparatus, an amount of the second image information being smaller than an amount of the first image information;

acquiring result information, the result information being a result of an operation which is executed on the sent second image information in the information processing apparatus, wherein the result information includes information with a z-order of the at least one element in the second image information in a direction perpendicular to a display screen, wherein the z-order indicates whether the at least one element is arranged nearer or farther to a viewer of the second image information;

editing the first image information according to the acquired result information, so that if at least two elements superimpose each other, a portion of the image information covered by any of the at least two elements is not included by the edited first image information; and sending the edited first image information to the information processing apparatus for printing by a printing device provided at the information processing apparatus.

7. The image processing method according to claim 6, wherein the editing the first image information includes executing at least one of a moving process, an enlargement process, a reduction process, and a deletion process on the at least one element to edit the first image information.

8. An image processing method applied to an image processing apparatus including a communication unit for communicating with an information processing apparatus configured to process first image information and second image information in association with each other, both of the first information and the second image information representing at least one element and an amount of the second image information being smaller than an amount of the first image information; the method comprising:

receiving the second image information from the information processing apparatus via the communication unit;

displaying the received second image information on a given display device;

receiving an operation instruction for the displayed second image information;

processing the displayed second image information according to the operation instruction;

sending result information representing the processed and displayed second image information to the information processing apparatus, the result information includes information with a z-order of the at least one element in the second image information, wherein the z-order indicates whether the at least one element is arranged nearer or farther to a viewer of the second image information;

receiving the first image information via the communication unit, the first image information being edited according to the result information on the information processing apparatus;

saving an additional information, if the operation instruction includes an adding process for the adding additional information to the displayed second image information;

executing a superimpose process for the received first image information and the saved additional information; and causing a given printing device to print at least one of the received first image information or a result of the superimpose process.

9. An image information distributing method applied to a network system including a first image processing apparatus and a second image processing apparatus, the first image processing apparatus and the second image processing apparatus being interconnected with each other, the first image processing apparatus configured to store first image information and second image information, both of the first image information and the second image information representing at least one element, an amount of the second image information being smaller than an amount of the first image information, the method comprising:

sending the second image information to the second image processing apparatus from the first image processing apparatus;

displaying the second image information on a given display device of the second image processing apparatus;

receiving an operation instruction for the displayed second image information in the second image processing apparatus;

processing the displayed second image information according to the operation instruction in the second image processing apparatus;

sending result information representing the processed and displayed second image information to the first image processing apparatus from the second image processing apparatus, the result information includes information with a z-order of the at least one element in the second image information, wherein the z-order indicates whether the at least one element is arranged nearer or farther to a viewer of the second image information, wherein when the operation instruction includes adding process for adding additional information to the displayed second image information, wherein the additional information is saved in the second image processing apparatus;

editing the first image information, in the first image processing apparatus, according to the result information;

sending the edited first image information in a compressed format to the second image processing apparatus from the first image processing apparatus;

executing a superimpose process for the received first image information and the saved additional information in the second image processing apparatus; and causing a given printing device of the second image processing apparatus to print a result of the superimpose process.

10. The image information distributing method according to claim 9, wherein the network system includes other image processing apparatuses, and the sending of the edited first image information includes broadcasting the first image information which is edited and composed to a plurality of desired information processing apparatuses of the second image processing apparatus and the other image processing apparatuses.

11. A computer storage medium including computer readable program code means embodied in the medium, the storage medium being applicable to a computer including a communication unit configured to communicate with an apparatus and a storage configured to store first image information which represents at least one element, the apparatus configured to operate on image information, the computer readable program code means comprising:

computer readable program code means for sending second image information which represents the at least one element to the apparatus, an amount of the second image information being smaller than an amount of the first image information;

computer readable program code means for acquiring result information, the result information being a result of an operation which is executed on the sent second image information in the apparatus, wherein the acquired result information includes information with a z-order of the at least one element in the second image information, wherein the z-order indicates whether the at least one element is arranged nearer or farther to a viewer of the second image information;

computer readable program code means for editing the first image information according to the acquired result information, said first image information being edited according to the acquired result information so that when a plurality of elements superimpose each other, the portion of the image information covered by any of the plurality of elements is not included by the edited first image information; and computer readable program code means for sending the edited first image information to the apparatus for printing by a printing device provided at the information processing apparatus.

12. A computer storage medium including computer readable program code means embodied in the medium, the storage medium being applicable to a computer including a communication unit for communicating with an apparatus configured to process first image information and second image information in association with each other, both of the first image information and the second image information representing at least one element, an amount of the second image information being smaller than an amount of the first image information, the computer readable program code means comprising:

computer readable program code means for receiving the second image information from the apparatus via the communication unit;

computer readable program code means for displaying the received second image information on a given display device;

computer readable program code means for receiving an operation instruction for the displayed second image information;

computer readable program code means for processing the displayed second image information according to the operation instruction;

computer readable program code means for sending result information representing the processed and displayed second image information to the apparatus, the result information includes information with a z-order of the at least one element in the second image information, wherein the z-order indicates whether the at least one element is arranged nearer or farther to a viewer of the second image information;

computer readable program code means for saving additional information when the operation instruction includes an adding process for adding the additional information to the displayed second image information;

computer readable program code means for receiving the first image information via the communication unit, the first image information being edited according to the result information on the apparatus;

computer readable program code means for executing a superimpose process for the received first image information and the saved additional information; and computer readable program code means for causing a given printing device to print a result of the superimpose process.

13. The image processing system according to claim 1, wherein said first image is stored in a compressed format in the storage, and wherein said first image is edited by the controller according to the result information in an intermediate process where the first image information stored in the storage is expanded.

14. The image processing method according to claim 6, wherein said first image is stored in a compressed format in the storage, and wherein said first image is edited by the controller according to the acquired result information in an intermediate process where the first image information stored in the storage is expanded.

15. The image information distributing method according to claim 9, wherein the image processing apparatus is configured to store said first image in a compressed format, and wherein said first image is edited in the first image processing apparatus, according to the acquired result information in an intermediate process in an intermediate process where the first image information stored in the storage is expanded.

* * * * *